US012674905B2

(12) United States Patent
Soepriatna et al.

(10) Patent No.: US 12,674,905 B2
(45) Date of Patent: Jul. 7, 2026

(54) MULTI-COMPONENT PROCESSING FOR SEISMIC WHILE DRILLING

(71) Applicant: Schlumberger Technology Corporation, Sugar Land, TX (US)

(72) Inventors: Adrien Hendra Soepriatna, Sagamihara (JP); Philip Neville Armstrong, London (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 19/270,688

(22) Filed: Jul. 16, 2025

(65) Prior Publication Data

US 2026/0177720 A1      Jun. 25, 2026

Related U.S. Application Data

(60) Provisional application No. 63/736,681, filed on Dec. 20, 2024.

(51) Int. Cl.
*G01V 1/48* (2006.01)
*G01V 1/18* (2006.01)
(Continued)

(52) U.S. Cl.
CPC ................ *G01V 1/48* (2013.01); *G01V 1/186* (2013.01); *G01V 1/20* (2013.01); *G01V 1/305* (2013.01); *G01V 1/46* (2013.01)

(58) Field of Classification Search
None
See application file for complete search history.

(56) References Cited

U.S. PATENT DOCUMENTS 4,545,039 A * 10/1985 Savit ...................... G01V 1/005
367/39
5,173,879 A * 12/1992 Cung ..................... G01V 1/366
367/21
(Continued)

FOREIGN PATENT DOCUMENTS

WO        2010144244 A2     12/2010
WO        2011005436 A2      1/2011
WO        WO-2016071728 A1 *  5/2016  ............. G01V 1/301

OTHER PUBLICATIONS

Rutty, M. J., and S. A. Greenhalgh. "The correlation of seismic events on multicomponent data in the presence of coherent noise." Geophysical Journal International 113.2 (1993): 343-358. (Year: 1993).*

(Continued)

*Primary Examiner* — Jonathan D Armstrong
(74) *Attorney, Agent, or Firm* — Kyle R. Miiller

(57)                ABSTRACT
Certain aspects of the present disclosure provide a method for providing stacked multi-component seismic while drilling (SWD) seismic waveforms. The method includes obtaining multi-component SWD seismic pressure and shear waveforms associated with a planned well. The method includes pre-processing, at the at least one processor, the multi-component seismic SWD waveforms to generate an ordered subset of filtered SWD seismic waveforms and determining, based on a maximum eigenvalue associated with first and maximum correlation matrices of the pressure and shear waveform components, a number of the subset of filtered SWD seismic waveforms to stack. The method includes estimating a first arrival time (FAT) and sending the stacked number of filtered SWD seismic waveforms to a surface equipment, centered around the estimated FAT.

13 Claims, 10 Drawing Sheets

(51) Int. Cl.

| | | |
|---|---|---|
| *G01V 1/20* | (2006.01) | |
| *G01V 1/30* | (2006.01) | |
| *G01V 1/46* | (2006.01) | |

(56) References Cited

U.S. PATENT DOCUMENTS

| | | | | |
|---|---|---|---|---|
| 5,511,038 | A | 4/1996 | Angeleri | |
| 5,719,821 | A * | 2/1998 | Sallas | G01V 1/375 |
| | | | | 702/14 |
| 5,721,710 | A * | 2/1998 | Sallas | G01V 1/375 |
| | | | | 702/14 |
| 7,299,884 | B2 | 11/2007 | Mathiszik | |
| 9,513,372 | B2 * | 12/2016 | Valero | G01V 1/48 |
| 11,053,791 | B2 * | 7/2021 | Langnes | G01V 1/226 |
| 11,530,606 | B2 * | 12/2022 | Langnes | G01V 1/226 |
| 12,313,800 | B2 * | 5/2025 | Di | G01V 1/36 |
| 2008/0049551 | A1 * | 2/2008 | Muyzert | G01V 1/38 |
| | | | | 702/14 |
| 2009/0175126 | A1 * | 7/2009 | Lambert | G01V 1/32 |
| | | | | 367/59 |
| 2010/0315901 | A1 * | 12/2010 | Coman | G01V 1/42 |
| | | | | 367/25 |
| 2011/0069581 | A1 * | 3/2011 | Krohn | G01V 1/364 |
| | | | | 367/43 |
| 2011/0120724 | A1 * | 5/2011 | Krohn | G01V 1/30 |
| | | | | 703/2 |
| 2014/0204700 | A1 * | 7/2014 | Valero | G06F 17/14 |
| | | | | 367/87 |
| 2017/0371072 | A1 * | 12/2017 | Shetty | G01V 11/00 |
| 2020/0032639 | A1 * | 1/2020 | Langnes | G01H 9/004 |
| 2022/0414301 | A1 * | 12/2022 | Thiruvenkatanathan | G01V 1/001 |
| 2023/0109902 | A1 * | 4/2023 | Di | G06N 3/045 |
| | | | | 382/275 |
| 2024/0141773 | A1 * | 5/2024 | Ma | G01V 3/32 |
| 2024/0337768 | A1 * | 10/2024 | Mizuno | E21B 47/04 |

OTHER PUBLICATIONS

Sollberger, David. "Multicomponent Seismic Processing for Coherent Noise Suppression and Arrival Identification.". Master Thesis. 2013. (Year: 2013).*

Allen, R. V., "Automatic earthquake recognition and timing from single traces", Bulletin of the Seismological Society of America, Oct. 1, 1978, 68, No. 5, pp. 1521-1532.

Tokhy, M. El et al., "Seismic While-Drilling, Real-Data Reposition the Well in the Seismic vol. and Improve the Accuracy of the Depth Prognosis of the Target Events", SPE Middle East Intelligent Oil Gas Conference Exhibition, SPE-176763-MS, Sep. 15, 2015, Abu Dhabi, UAE, pp. 1-9.

* cited by examiner

200

Band-pass Filter

500

Selection Indicator

| | |
|---|---|
| 10 | RC:18 |
| | CORR:99 |
| 11 | RC:32 |
| | CORR:99 |
| 9 | RC:25 |
| | CORR:99 |
| 3 | RC:26 |
| | CORR:99 |
| 4 | RC:62 |
| | CORR:99 |
| 5 | RC:11 |
| | CORR:99 |
| 7 | RC:18 |
| | CORR:99 |
| 8 | RC:22 |
| | CORR:98 |
| 6 | RC:6 |
| | CORR:94 |
| 12 | RC:4 |
| | CORR:91 |
| 17 | RC:2 |
| | CORR:29 |
| 22 | RC:2 |
| | CORR:29 |
| 20 | RC:1 |
| | CORR:21 |
| 14 | RC:6 |
| | CORR:16 |
| 18 | RC:126 |
| | CORR:9 |

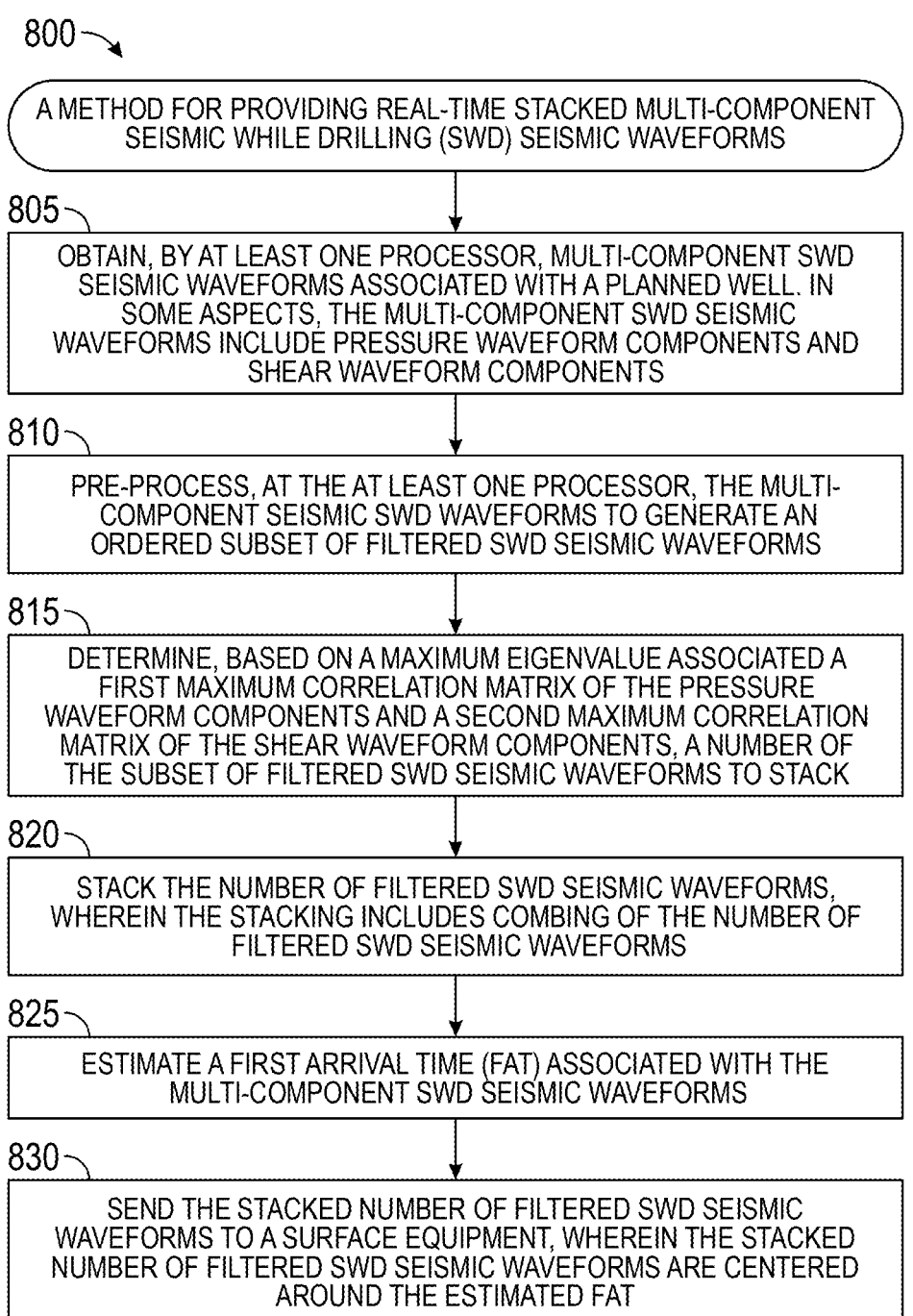

800 ⌐

A METHOD FOR PROVIDING REAL-TIME STACKED MULTI-COMPONENT SEISMIC WHILE DRILLING (SWD) SEISMIC WAVEFORMS

805 ⌐

OBTAIN, BY AT LEAST ONE PROCESSOR, MULTI-COMPONENT SWD SEISMIC WAVEFORMS ASSOCIATED WITH A PLANNED WELL. IN SOME ASPECTS, THE MULTI-COMPONENT SWD SEISMIC WAVEFORMS INCLUDE PRESSURE WAVEFORM COMPONENTS AND SHEAR WAVEFORM COMPONENTS

810 ⌐

PRE-PROCESS, AT THE AT LEAST ONE PROCESSOR, THE MULTI-COMPONENT SEISMIC SWD WAVEFORMS TO GENERATE AN ORDERED SUBSET OF FILTERED SWD SEISMIC WAVEFORMS

815 ⌐

DETERMINE, BASED ON A MAXIMUM EIGENVALUE ASSOCIATED A FIRST MAXIMUM CORRELATION MATRIX OF THE PRESSURE WAVEFORM COMPONENTS AND A SECOND MAXIMUM CORRELATION MATRIX OF THE SHEAR WAVEFORM COMPONENTS, A NUMBER OF THE SUBSET OF FILTERED SWD SEISMIC WAVEFORMS TO STACK

820 ⌐

STACK THE NUMBER OF FILTERED SWD SEISMIC WAVEFORMS, WHEREIN THE STACKING INCLUDES COMBING OF THE NUMBER OF FILTERED SWD SEISMIC WAVEFORMS

825 ⌐

ESTIMATE A FIRST ARRIVAL TIME (FAT) ASSOCIATED WITH THE MULTI-COMPONENT SWD SEISMIC WAVEFORMS

830 ⌐

SEND THE STACKED NUMBER OF FILTERED SWD SEISMIC WAVEFORMS TO A SURFACE EQUIPMENT, WHEREIN THE STACKED NUMBER OF FILTERED SWD SEISMIC WAVEFORMS ARE CENTERED AROUND THE ESTIMATED FAT

*FIG. 8*

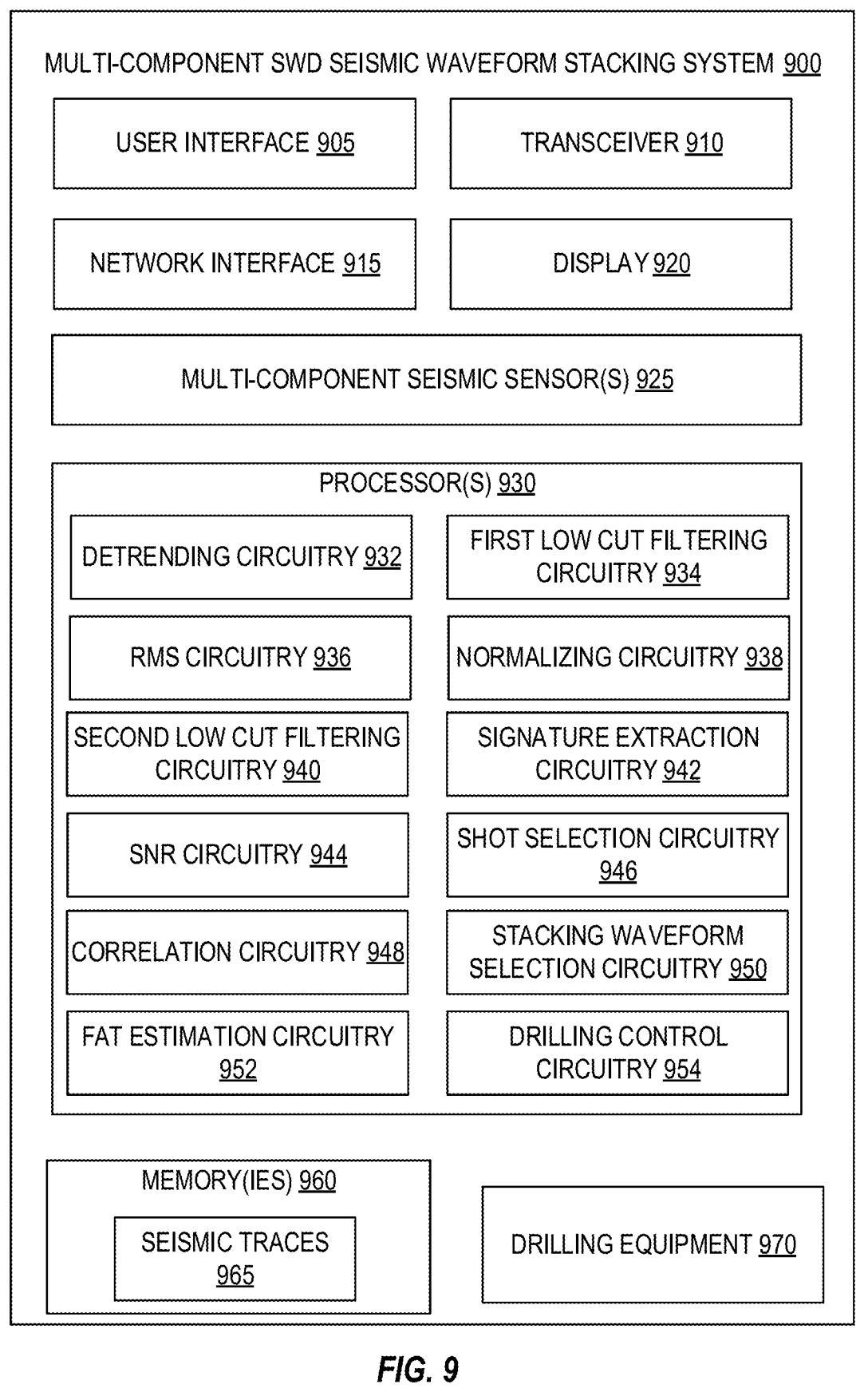

MULTI-COMPONENT SWD SEISMIC WAVEFORM STACKING SYSTEM 900

| USER INTERFACE 905 | TRANSCEIVER 910 |
|---|---|
| NETWORK INTERFACE 915 | DISPLAY 920 |

MULTI-COMPONENT SEISMIC SENSOR(S) 925

PROCESSOR(S) 930

| DETRENDING CIRCUITRY 932 | FIRST LOW CUT FILTERING CIRCUITRY 934 |
|---|---|
| RMS CIRCUITRY 936 | NORMALIZING CIRCUITRY 938 |
| SECOND LOW CUT FILTERING CIRCUITRY 940 | SIGNATURE EXTRACTION CIRCUITRY 942 |
| SNR CIRCUITRY 944 | SHOT SELECTION CIRCUITRY 946 |
| CORRELATION CIRCUITRY 948 | STACKING WAVEFORM SELECTION CIRCUITRY 950 |
| FAT ESTIMATION CIRCUITRY 952 | DRILLING CONTROL CIRCUITRY 954 |

MEMORY(IES) 960

SEISMIC TRACES 965

DRILLING EQUIPMENT 970

*FIG. 9*

MULTI-COMPONENT PROCESSING FOR SEISMIC WHILE DRILLING

CROSS-REFERENCE TO RELATED APPLICATIONS

This application claims priority to and benefit of U.S. Provisional Patent Application No. 63/736,681 filed on Dec. 20, 2024, which is incorporated by reference herein in its entirety.

FIELD OF THE DISCLOSURE

Aspects of the present disclosure relate to hydrocarbon production and, more particularly, to techniques for multi-component processing for seismic-while-drilling.

DESCRIPTION OF RELATED ART

Oil and gas drilling is a complex process that involves several stages to extract hydrocarbons from beneath the Earth's surface. The drilling process typically begins with setting up a drilling rig at a designated site, where the crew prepares to drill a well.

An initial step in drilling a well may involve drilling a surface hole down to a predetermined depth using a drill bit attached to a drill string. During drilling, drill mud may be circulated, which serves multiple purposes, including cooling and lubricating the drill bit and carrying rock cuttings to the surface. Once the desired depth is reached, steel casing pipes are inserted into the wellbore and cemented in place. This casing provides structural support to prevent the well from collapsing and isolates different geological layers within the well. The drilling continues until it reaches the target depth where oil or gas deposits are expected.

During and after drilling, various tests may be conducted to evaluate the well, including logging tools that measure rock properties and fluid sampling. After evaluation, if the well is deemed productive, it undergoes completion processes to facilitate oil or gas extraction. One example is hydraulic fracturing (fracking) to enhance recovery from tight formations.

Seismic data plays a crucial role in oil and gas exploration and drilling operations. It provides essential insights into subsurface geological structures, helping to identify potential hydrocarbon reservoirs before drilling begins. Seismic surveys, such as seismic while drilling (SWD), can create detailed images of subsurface formations by emitting sound waves that reflect off geological layers. These reflections are captured and analyzed to map out potential oil and gas reserves, allowing geologists to make informed decisions about where to drill.

Surface shots refer to controlled explosions or other energy sources (such as vibrators) placed at or near the Earth's surface, which produce seismic waves that travel through the subsurface. These waves are then reflected back to the surface or recorded by sensors to create an image of the underground formations. Seismic traces represent the recorded waveforms over time.

During SWD, the data stack may include unwanted noise from sources like drilling vibrations, equipment interference, or poor signal alignment, which can contaminate the seismic data. This contamination can make the real-time output less accurate, and complicate the task of interpreting subsurface features clearly.

Processing techniques are often applied in an attempt to clean up the data and enhance signal clarity. In seismic data processing, "stacking" refers to combining multiple recordings (seismic traces) from one or more sensors over time. Stacking can be applied to recordings from various sensors if the sensors are in different locations, such as in a seismic array, to enhance the overall seismic image. In SWD, however, stacking usually focuses on downhole recordings from the same sensor over time. Stacking may improve the signal-to-noise (SNR) ratio by filtering out noise, such as by aligning seismic traces and averaging out noise by summing seismic traces that have captured the same seismic event at slightly different times, such as reflections of a surface shot recorded at the same sensor location during multiple seismic shots.

The seismic sensors used in SWD operation may include single-component sensors and/or multi-component sensors. A single-component sensor (e.g., sometimes referred to as a 1-C sensor) records only one type of a seismic wave, such as pressure waves (P-waves), or ground motion in a single direction (e.g., vertical, Z-axis). In some cases, P-waves may be waves that travel through solids, liquids, and gases. An example of a 1-C seismic sensor is a hydrophone. Hydrophones are designed to detect acoustic waves by measuring pressure changes caused by the sound waves traveling through the medium. Hydrophones may convert the pressure variations into electrical signals corresponding to the pressure changes.

A multi-component sensor records multiple types of waves. For example, a three-component sensor (e.g., sometimes referred to as a 3-C sensor), records motion in three components or directions (X-, Y-, and Z-axes), capturing both P-wave and shear waves (S-waves), providing a fuller pictures of the seismic waves than provided by a 1-C sensor. In some cases, S-waves may travel through solids, but not liquids or gas. An example of a 3-C seismic sensor is a geophone. Geophones are designed to detect ground vibrations by measuring ground motion caused by seismic waves traveling through solid materials. Geophones may convert the detected motion to electrical signals corresponding to the ground vibrations.

A 4-C sensor may refer to a combination of 1-C and 3-C sensors. In some cases, a 4-C sensor involves three orthogonal geophones (measuring motion in three directions: vertical, radial, and transverse) and a hydrophone (measuring pressure). This provides a more complete set of seismic data, capturing both P-waves and S-waves. This expanded data set may improve imaging by compensating for complexities like subsurface heterogeneity and fluid variations, and enables more advanced analyses, such as distinguishing sand from shale or detecting reservoir boundaries. 4-C data capture may be particularly beneficial for challenging environments, such as under salt domes or gas plumes, where traditional 1-C data can struggle to provide clarity.

In some cases, 1-C data may be collected for downhole processing, while 4-C data may be collected for surface processing. The downhole tool may not be able to precisely predict the exact arrival times of surface shots due to the downhole tool being located within the wellbore rather than at the surface. This timing unpredictability, combined with the path the waves take through varying geological formations, and other sources of unwanted noise, can lead to noisy and distorted waveforms being recorded. In this case, the stack may include noisy waveforms in the stack, which can contaminate the real-time output seismic data window.

Current stacking techniques are designed for downhole processing of 1-C data.

Accordingly, what is needed are stacking techniques are needed for multi-component processing.

SUMMARY

One aspect provides a method for providing stacked multi-component seismic while drilling (SWD) seismic waveforms. The method includes obtaining, by at least one processor, multi-component SWD seismic waveforms associated with a planned well. The multi-component SWD seismic waveforms include pressure waveform components and shear waveform components. The method includes pre-processing, at the at least one processor, the multi-component seismic SWD waveforms to generate an ordered subset of filtered SWD seismic waveforms. The method includes determining, based on a maximum eigenvalue associated a first maximum correlation matrix of the pressure waveform components and a second maximum correlation matrix of the shear waveform components, a number of the subset of filtered SWD seismic waveforms to stack. The method includes stacking the number of filtered SWD seismic waveforms. The stacking includes combing of the number of filtered SWD seismic waveforms. The method includes estimating a first arrival time (FAT) associated with the multi-component SWD seismic waveforms. The method includes sending the stacked number of filtered SWD seismic waveforms to a surface equipment. The stacked number of filtered SWD seismic waveforms are centered around the estimated FAT.

Another aspect provides a non-transitory computer readable medium storing computer executable code for providing stacked multi-component seismic while drilling (SWD) seismic waveforms. The computer executable code includes code for obtaining, by at least one processor, multi-component SWD seismic waveforms associated with a planned well. The multi-component SWD seismic waveforms include pressure waveform components and shear waveform components. The computer executable code includes code for pre-processing, at the at least one processor, the multi-component seismic SWD waveforms to generate an ordered subset of filtered SWD seismic waveforms. The computer executable code includes code for determining, based on a maximum eigenvalue associated with a first maximum correlation matrix of the pressure waveform components and a second maximum correlation matrix of the shear waveform components, a number of the subset of filtered SWD seismic waveforms to stack. The computer executable code includes code for stacking the number of filtered SWD seismic waveforms. The stacking includes combing of the number of filtered SWD seismic waveforms. The computer executable code includes code for estimating a first arrival time (FAT) associated with the multi-component SWD seismic waveforms. The computer executable code includes code for sending the stacked number of filtered SWD seismic waveforms to a surface equipment. The stacked number of filtered SWD seismic waveforms are centered around the estimated FAT.

Another aspect provides a drilling system. The drilling system includes drilling equipment for drilling a planned well. The drilling system includes a seismic while drilling (SWD) system. The SWD system includes one or more processors at a surface of the planned well. The SWD system includes one or more processors located downhole in the planned well. The SWD system includes a seismic tool configured to generate a plurality of seismic shots at different times. The SWD system includes a plurality of seismic sensors. The plurality of seismic sensors include one or more geophones. The plurality of seismic sensors include one or more hydrophones. The one or more geophones are configured to detect pressure waveform components generated by the seismic shot over a time window. The one or more geophones are configured to detect shear waveform components generated by the seismic shot over the time window. The SWD system is configured to pre-process the pressure waveform components and the shear waveform components to generate an ordered subset of filtered SWD seismic waveforms. The SWD system is configured to determine, based on a maximum eigenvalue associated with a first maximum correlation matrix of the pressure waveform components and a second maximum correlation matrix of the shear waveform components, a number of the subset of filtered SWD seismic waveforms to stack. The SWD system is configured to stack the number of filtered SWD seismic waveforms. The stacking includes combing of the number of filtered SWD seismic waveforms. The SWD system is configured to estimate a first arrival time (FAT) associated with the multi-component SWD seismic waveforms. The SWD system is configured to send the stacked number of filtered SWD seismic waveforms to the one or more surface processors. The stacked number of filtered SWD seismic waveforms are centered around the estimated FAT. The drilling system includes a controller configured automatically control the drilling equipment for drilling the planned well based on the stacked number of filtered SWD seismic waveforms.

The following description and the appended figures set forth certain features for purposes of illustration.

BRIEF DESCRIPTION OF DRAWINGS

The appended figures depict certain features of the various aspects described herein and are not to be considered limiting the scope of this disclosure.

FIG. 8 illustrates an example workflow for multi-component SWD stacking according to certain aspects.

FIG. 9 illustrates an example processing system for multi-component SWD stacking according to certain aspects.

DETAILED DESCRIPTION

Aspects of the present disclosure provide apparatuses, methods, systems, and computer-readable mediums for stacking for processing multi-component seismic while drilling (SWD) data.

Example Seismic While Drilling System

Figure 1:
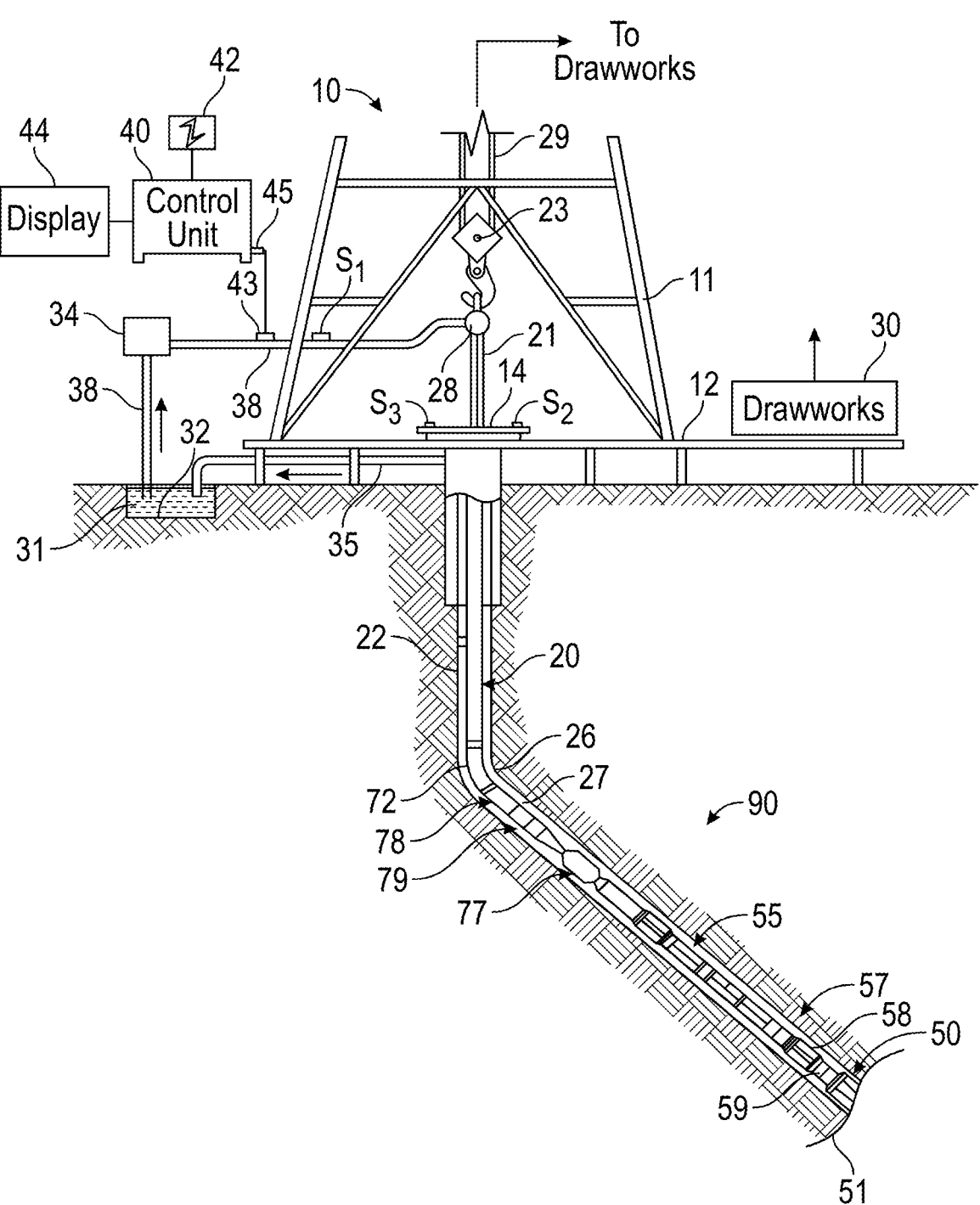
FIG. 1 depicts an example seismic while drilling (SWD) system according to certain aspects.

FIG. 1 depicts an example drilling system 10 in which multi-component seismic while drilling (SWD) may be performed according to certain aspects. It should be understood that FIG. 1 merely depicts an example drilling system, the multi-component SWD stacking techniques described herein may be performed in any drilling system.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the borehole. The drilling system 10 depicts a conventional derrick 11 erected on a floor 12 which supports a rotary table 14 that is rotated by a prime mover such as an electric motor (not shown) at a desired rotational speed. The drillstring 20 includes tubing such as a drill pipe 22 or a coiled-tubing extending downward from the surface into the borehole 26. The drillstring 20 is pushed into the borehole 26 when a drill pipe 22 is used as the tubing. For coiled-tubing applications, a tubing injector, such as an injector (not shown), however, is used to move the tubing from a source thereof, such as a reel (not shown), to the borehole 26. The drill bit 50 attached to the end of the drillstring breaks up the geological formations when it is rotated to drill the borehole 26. If a drill pipe 22 is used, the drillstring 20 is coupled to a drawworks 30 via a kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 can provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

The drill bit 50 can be rotated by only rotating the drill pipe 22. Alternatively, a downhole motor 55 (mud motor) disposed in the drilling assembly 90 can rotate the drill bit 50 and the drill pipe 22 is rotated usually to supplement the rotational power and to effect changes in the drilling direction.

The mud motor 55 may be coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 may be placed near the drill bit 50. The drilling sensor module may contain sensors, circuitry, and processing software and algorithms relating to the dynamic drilling parameters. Such parameters can include bit bounce, stick-slip of the drilling assembly, backward rotation, torque, shocks, borehole and annulus pressure, acceleration measurements, and other measurements of the drill bit condition. A suitable telemetry or communication sub 77 using, for example, two-way telemetry, is also provided as illustrated in the drilling assembly 90. The drilling sensor module processes the sensor information and transmits it to the surface control unit 40 via the telemetry system 77.

The communication sub 77, a power unit 78 and a measurement while drilling (MWD) tool 79 are all connected in tandem with the drillstring 20. Flex subs, for example, are used in connecting the MWD tool 79 in the drilling assembly 90. Such subs and tools may form the bottom hole drilling assembly 90 between the drillstring 20 and the drill bit 50. The drilling assembly 90 may make various measurements including the pulsed nuclear magnetic resonance measurements while the borehole 26 is being drilled. The communication sub 77 obtains the signals and measurements and transfers the signals, using two-way telemetry, for example, to be processed on the surface. Alternatively, the signals can be processed using a downhole processor at a suitable location (not shown) in the drilling assembly 90.

The surface control unit 40 or processor may also receive one or more signals from other downhole sensors and devices and signals from sensors $S_1$-$S_3$ and other sensors used in the system 10 and processes such signals according to programmed instructions provided to the surface control unit 40. The surface control unit 40 may display desired drilling parameters and other information on a display/monitor 44 utilized by an operator to control the drilling operations. The surface control unit 40 can include a computer or a microprocessor-based processing system, memory for storing programs or models and data, a recorder for recording data, and other peripherals. The control unit 40 can be adapted to activate alarms 42 when certain unsafe or undesirable operating conditions occur.

In some aspects, the drilling system 10 includes one or more downhole processors (not shown), one or more surface processors (not shown), or both downhole processors and surface processors for processing seismic data. The processors may be configured to perform stacking for multi-component SWD data in accordance with aspects described herein.

For example, the drilling system 10 may include a surface seismic source and a reference receiver at the surface and/or a downhole receiver. Seismic waves originating at the surface seismic source may be reflected by an interface and received the surface and/or downhole receivers. The received seismic waves may be processed in accordance with aspects described herein for stacking multi-component SWD data. One example SWD system is Seismic Vision (R) provided by SLB Ltd. (Houston, Texas, USA).

Example Stacking for Multi-Component Seismic While Drilling System

Figure 2A:
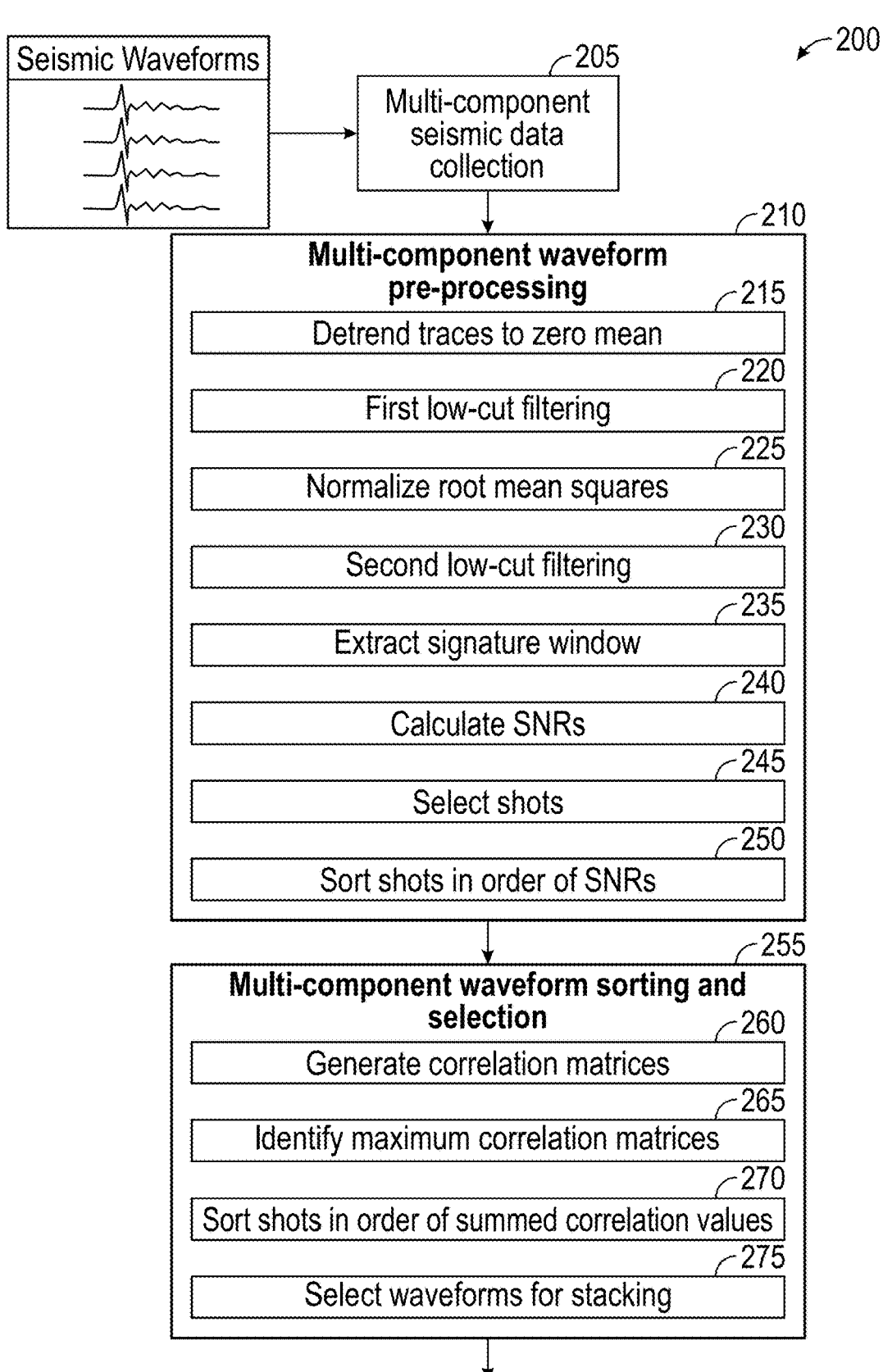
FIGS. 2A-2B depicts an example process flow for multi-component SWD stacking according to certain aspects.
Figure 2B:
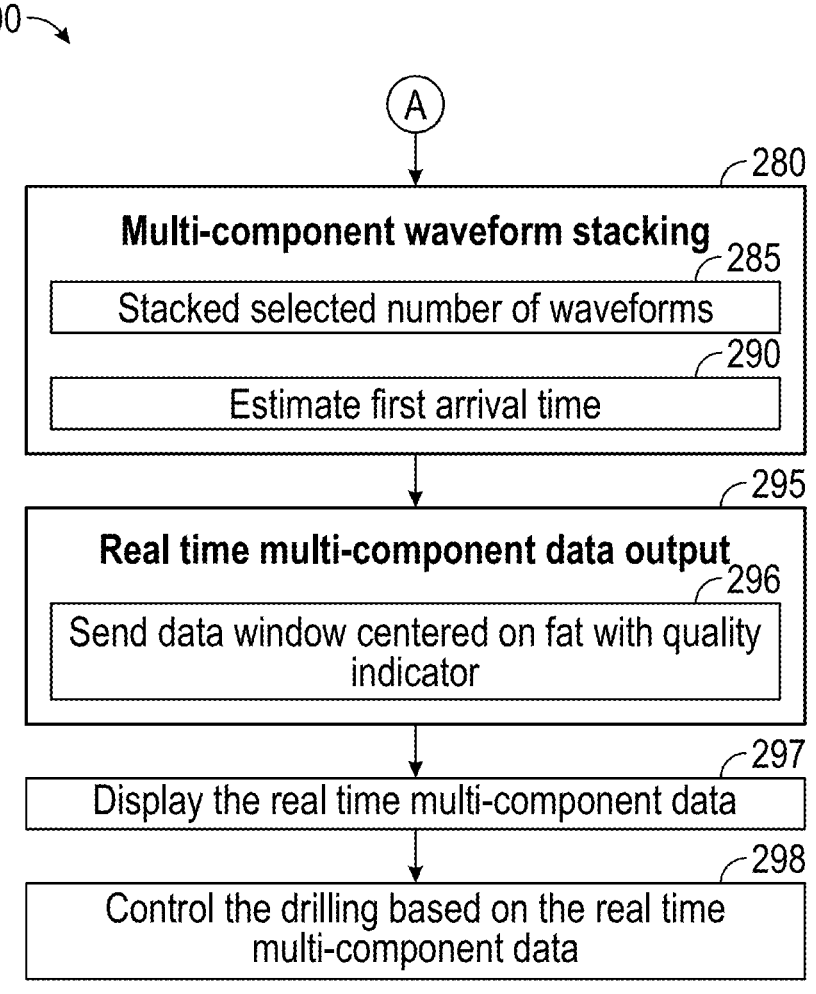

FIGS. 2A-2B depicts a process flow 200 for stacking multi-component seismic while drilling (SWD) data according to certain aspects. Aspects of the process flow may be performed by the system 900 described in more detail herein below.

As shown in FIG. 2A, the process flow 200 includes, at operation 205, obtaining multi-component seismic data. In some aspects, obtaining the multi-component seismic data at operation 205 includes collecting three-component (3C) or 4C SWD data using one or more 3C or 4C sensors. In some aspects, the obtaining the multi-component seismic data at operation 205 includes collecting a plurality of seismic traces associated with one or more seismic sensors over one or more time windows. As discussed herein, surface shots at or near the surface may be generated to produce seismic waves and multi-component seismic data may be obtained by recording traces of the seismic waves reflected back to the seismic sensors. In some aspects, the seismic sensors include geophones and/or a combination of geophones and hydrophone(s). In some aspects, the obtaining the multi-component seismic data at operation 205 includes collecting pressure wave data (P-wave waveforms) and shear wave data (S-wave waveforms).

As shown in FIG. 2A, the process flow 200 further includes, at operation 210, multi-component seismic waveform pre-processing of the multi-component seismic data.

In some aspects, the multi-component seismic waveform pre-processing of the multi-component seismic data, at operation 210, includes detrending seismic traces to zero mean at operation 215. In some aspects, the detrending seismic traces to zero mean at operation 215 removes any baseline trends or offsets in each of the obtained seismic traces so that the average value or mean is zero. Seismic traces may have unwanted low-frequency trends or offsets—which may be due to environmental noise, equipment drift, or inherent signal biases—that can skew data interpretation. By detrending the seismic traces to zero mean, these offsets are subtracted, centering the data around zero In some aspects, the multi-component seismic waveform pre-processing of the multi-component seismic data, at operation 210, includes first low-cut filtering at operation 220. In some aspects, a first low-cut filter (sometimes referred to as a "high-pass" filter) is applied to the multi-component seismic data (e.g., to the seismic traces detrended to zero mean) to remove noise frequencies, not associated with the source signal, from the recorded seismic waveforms. The low-cut filter attenuates or blocks low-frequency noise from the signal, while allowing frequencies above a certain cutoff frequency to pass. In some examples, low-cut filtering is useful for eliminating unwanted low-frequency components that can obscure or distort the signal, such as drilling noise and environmental noise (e.g., from machinery and/or ground movement), while retaining the higher frequencies that are more likely to contain valuable seismic reflections, improving the clarity of the data. In some aspects, the cutoff frequency may be chosen based on the specific noise characteristics in the data and the desired signal frequencies, allowing for better signal-to-noise (SNR) ratio and more accurate interpretation of subsurface features. In some aspects, the first low-cut filter is a genera low-cut filter fixed in the system.

In some aspects, the multi-component seismic waveform pre-processing of the multi-component seismic data, at operation 210, includes normalizing root mean squares (RMS) at operation 225. In some aspects, normalizing the RMSs at operation 225 includes normalizing RMSs of the low-cut filtered seismic traces detrended to zero mean. In some aspects, normalizing the RMSs at operation 210 includes normalizing the RMS of each 1C sensor (e.g., each hydrophone) shot within an analysis window (e.g., normalizing the RMS of each seismic trace associated with a 1C sensor or 1C sensor data) and normalizing each geophone shot within an analysis window with a single factor for all three components (e.g., normalizing the RMS of the each seismic trace associated with a 3C sensor or 3C sensor data). In some aspects, the RMS values may be calculated over a time window. The RMS measures the average signal amplitude and provides a sense of signal strength. The RMS value is then used to normalize the seismic data, which adjusts the amplitude so that each recording has a similar scale. This is particularly helpful for ensuring that the amplitudes of all signals are consistent, even if different shots have varying signal strengths. In some aspects, for the 3C data, a single RMS value may be computed for the combined 3-axis data, and this RMS value is then used as the normalization factor. This ensures that all components of the 3C sensor data are scaled consistently, helping to maintain the relative strengths of each directional signal. By normalizing this way, both the 1C and 3C seismic data are adjusted for uniform amplitude, which enhances the comparability of different signals (e.g., across multiple seismic traces) and allows for clearer interpretation of seismic events across multiple sensors and components.

Figure 3:
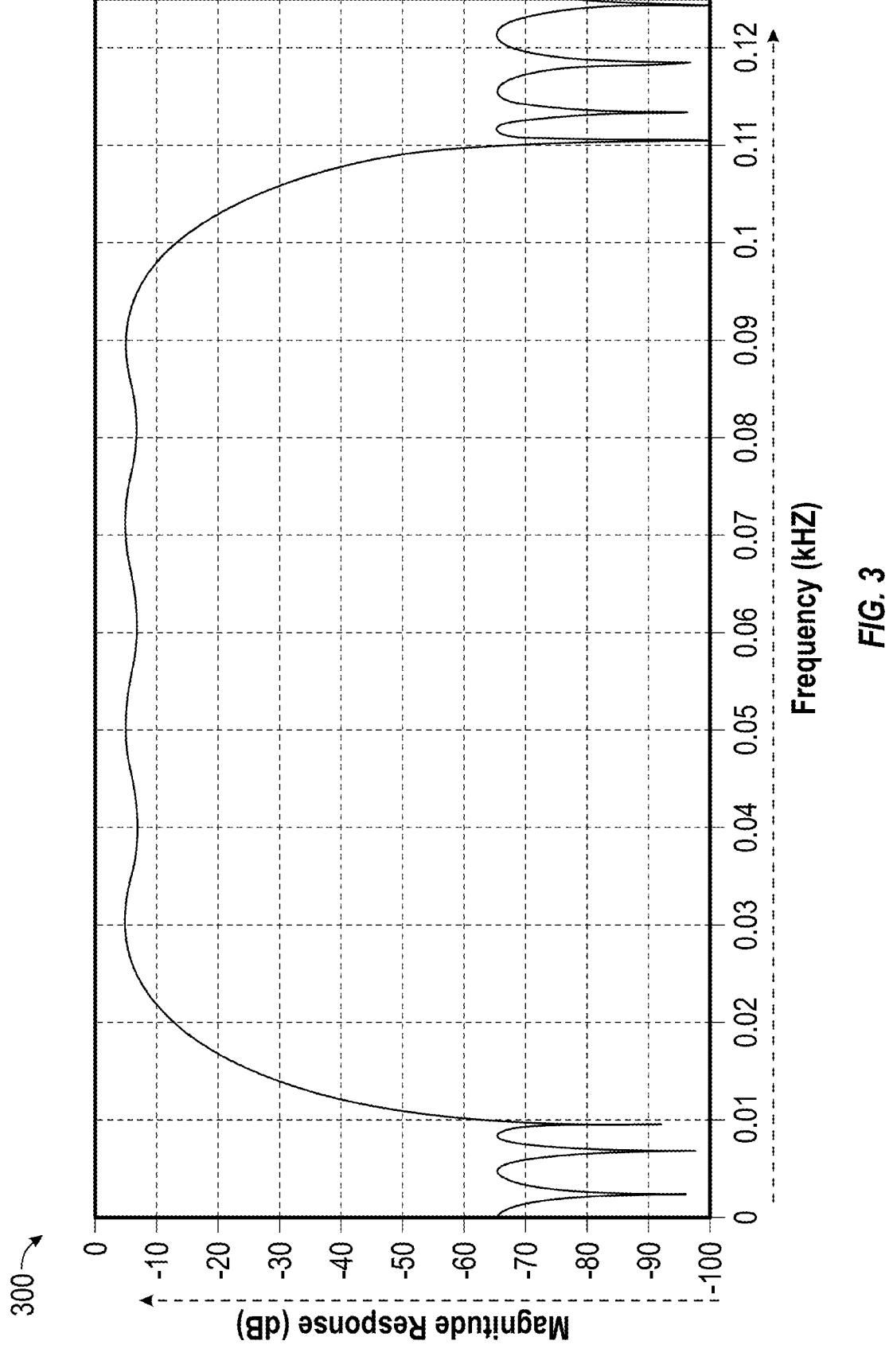
FIG. 3 depicts an example graph of magnitude response using a low-cut filter according to certain aspects.

In some aspects, the multi-component seismic waveform pre-processing of the multi-component seismic data, at operation 210, includes second low-cut filtering at operation 230. In some aspects, second low-cut filtering the multi-component seismic data at operation 230 includes low-cut filtering the normalized first low-cut filtered seismic traces detrended to zero mean. In some aspects, the second low-cut filtering at operation 230 uses a different low-cut filter than the first low-cut filtering at operation 220. In some aspects, the second low-cut filter may be selected autonomously by the system, or selected by a user, based on the seismic data. FIG. 3 depicts an example graph 300 of the magnitude response using an example low-cut filter according to certain aspects.

Figures 4A, 4B:
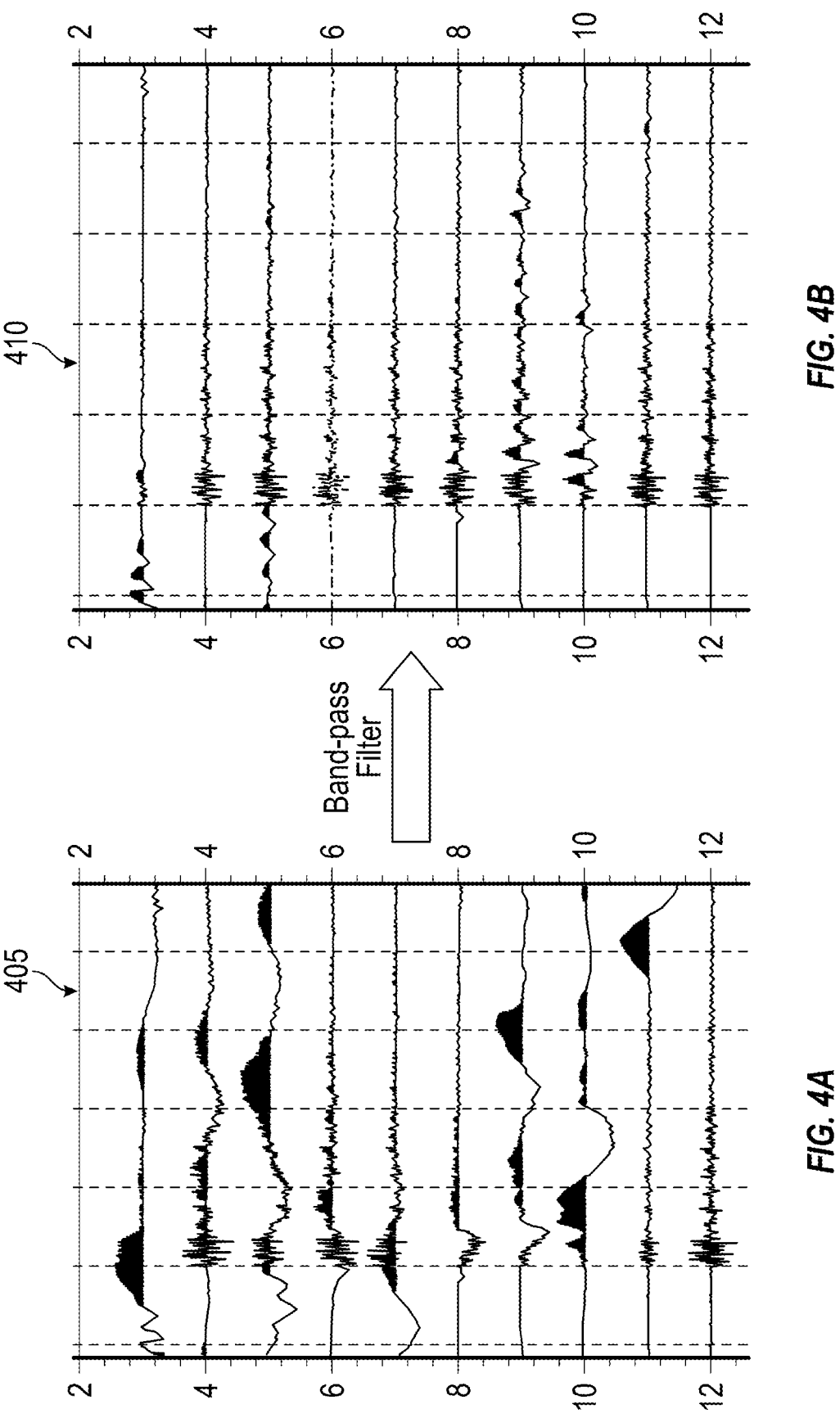
FIG. 4A depicts example seismic waveforms according to certain aspects.
FIG. 4B depicts example filtered seismic waveform signatures according to certain aspects.

Returning to the process flow 200 in FIG. 2A, in some aspects, the multi-component seismic waveform pre-processing of the multi-component seismic data, at operation 210, includes extracting a signature window at operation 235. In some aspects, extracting the signature window at operation 235 includes extracting the signature window of the second low-cut filtered normalized first low-cut filtered seismic traces detrended to zero mean. In some aspects, extracting the signature window at operation 235 includes isolating a specific portion of a seismic trace that contains a characteristic signal, often called the signature (or wavelet), which represents the unique imprint or response of the seismic source (e.g., an explosion, vibrator source, or air gun). The signature window typically includes only the essential parts of the signal while minimizing noise and reverberations, making it an important reference point for processing and interpreting seismic data. The signature window is a time segment of data, usually centered around the arrival of the primary wave, that includes key characteristics like amplitude, frequency content, and phase information. Knowing the source signature allows for deconvolution, which helps separate the source's effects from the true subsurface reflections, thus improving resolution and accuracy. A well-defined signature window isolates the relevant signal, reducing background noise and improving the clarity of the wavelet for further analysis. FIG. 4A depicts example seismic waveforms for a set of traces 405. As shown in FIG. 4A, the seismic waveforms include noise in the low-frequent regions. As shown in FIG. 4B, the seismic waveforms are can be filter with a high-pass filter for extraction of the seismic waveform signatures 410.

Returning to the process flow 200 in FIG. 2A, in some aspects, the multi-component seismic waveform pre-processing of the multi-component seismic data, at operation 210, includes calculating SNRs for the multi-component seismic data at operation 240. In some aspects, calculating the SNRs for the multi-component seismic data at operation 240 includes calculating the SNRs for each second low-cut filtered normalized first low-cut filtered seismic traces detrended to zero mean. In some aspects, the SNRs are calculated based on a maximum absolute value of the received signal over the noise.

$$SNR = \frac{\max(\mathrm{abs}(\mathrm{signal}))}{\max(\mathrm{abs}(\mathrm{noise}))}$$

Figure 5:
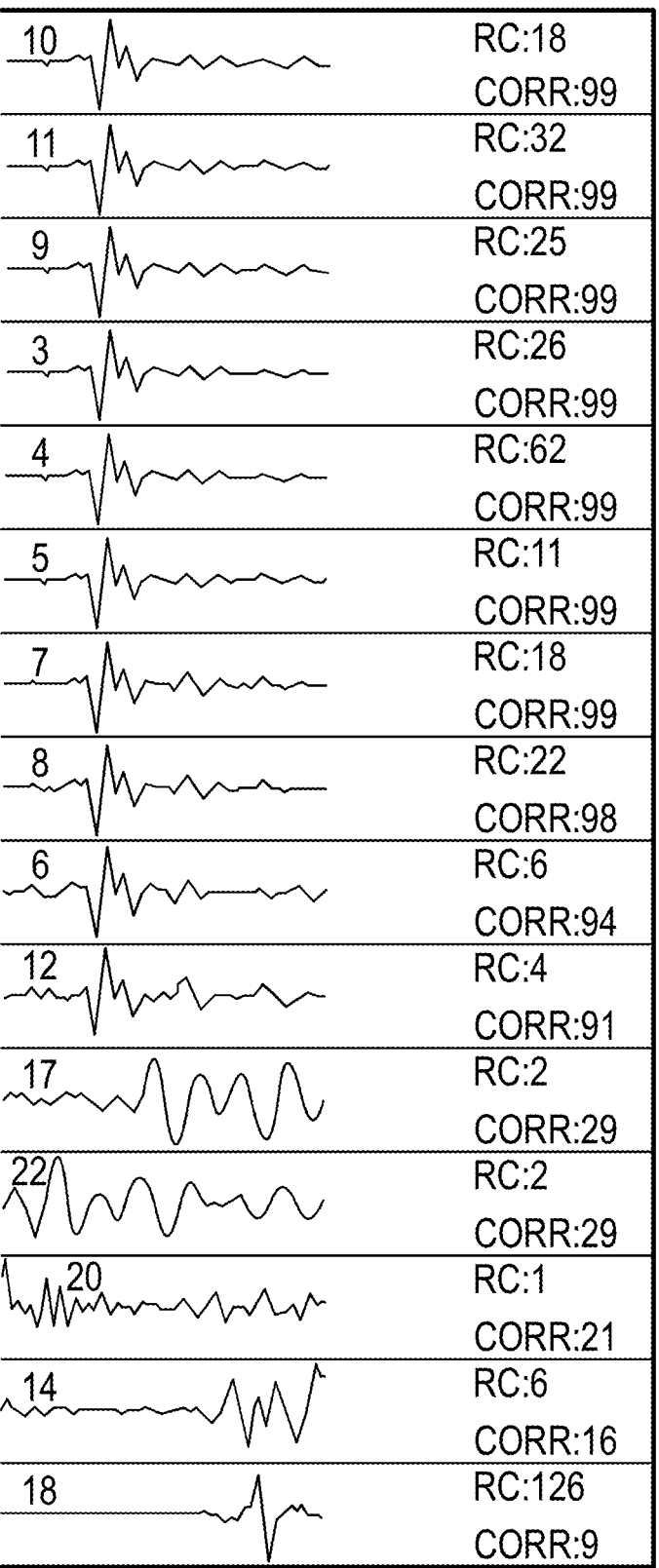
FIG. 5 illustrates an example of fifteen seismic traces selected based on the associated SNR values for the seismic traces.

In some aspects, the multi-component seismic waveform pre-processing of the multi-component seismic data, at operation 210, includes sorting the selected shots, or traces, in order of SNRs at operation 245. In some aspects, the selected shots or traces are sorted in descending order of the calculated SNR values for the selected shots or traces. FIG. 5 illustrates an example of fifteen seismic traces 500 selected based on the associated SNR values for the seismic traces.

In some aspects, the multi-component seismic waveform pre-processing of the multi-component seismic data, at operation 210, includes selecting shots (or traces) at operation 250. Different surface shots are separated in time. For a given surface shot, a set of seismic traces are collected for each component of the 4C seismic sensors. The SNR values are calculated for each of the seismic traces. In some aspects, based on the SNR values calculated for the selected seismic traces may be used to select a pre-configured number of seismic traces (e.g., 15 seismic traces). In the example of 15 selected shots, all of the associated seismic traces are selected—in this case 60 seismic traces. In some aspects, the selected seismic traces are the seismic traces with the highest SNR values. For example, the seismic traces may be selected based on:

MAXSNR$_{trace}$=max(SNR$_{trace}$,component)

Returning to FIG. 2A, the process flow 200 further includes, at operation 255, multi-component waveform sorting and selection.

In some aspects, the multi-component waveform sorting and selection at operation 255 includes generating correlation matrices at operation 260. In some aspects, generating the correlation matrices at operation 260 includes generating cross-correlation matrices for each component and each shot. Cross-correlation is a statistical technique used to measure the similarity or correlation between two signals as a function of the time-lag applied to one of the signals. Cross-correlation helps to identify how similar two seismic traces are at different time shifts. Here, the cross-correlation is a shot-to-shot correlation. For example, for each component (e.g., vertical, horizontal, and radial components of the 3C sensor and p-waves for the 1C sensor), the cross-correlation is calculated by comparing the recorded signals for the component across different shots. Referring the example above of 15 selected shots, a 15×15 correlation is calculated for all four components of the 4C seismic data. A matrix may be generated in which each element of the matrix represents the degree of correlation between recordings across the different seismic shots. The result is a correlation matrix that shows how well the seismic traces from different sensors or components match with one another at various time shifts, helping to identify patterns, detect noise, and optimize data alignment.

In some aspects, the multi-component waveform sorting and selection at operation 255 includes identifying maximum correlation (MAXCOR) matrices at operation 265. In some aspects, identifying the maximum correlation matrices at operation 265 includes generating one maximum correlation matrix for 3C data and one maximum correlation matrix for 1C data. Maximum correlation is a technique used to find the maximum correlation between different seismic traces or components. In some aspects, from the correlation matrices generated at operation 260, the maximal correlated matrix for the 3C seismic data components and the maximal correlated matrix for the 1C data components may be identified. The maximum correlated matrix for the 3C seismic data components shows the maximum correlation for all three components of the 3C sensor (vertical, radial, and transverse) across all seismic shots. Similarly, the maximum correlation matrix for the 1C seismic data shows the maximum correlation between the hydrophone's recorded data for each shot.

In some aspects, the multi-component waveform sorting and selection at operation 255 includes sorting shots in order of summed correlation values at operation 270. In some aspects, based on the correlation matrices generated at operation 260, shots are sorted in order of decreasing or order of summed correlation values. In some aspects, the shots are sorted using the maximum correlation matrices for the 1C seismic data for the 1C seismic traces or using the maximum correlation matrices for the 3C seismic data for the 3C seismic traces. In some aspects, whether to use maximum correlation matrices for the 1C or 3C seismic data may be determined based on the maximum SNR (a higher SNR means the data is clearer and less affected by noise). In some aspects, the summed correlation values refers to the total or cumulative correlation of a seismic trace (from either the 1C or 3C sensors) across multiple shots. Sorting the summed correlation values in descending order prioritizes the shots that have the highest correlation values. Shots with higher correlation values are likely to contain better, more reliable data, as they exhibit more consistent and aligned signals across sensors or components.

In some aspects, the multi-component waveform sorting and selection at operation 255 includes selecting seismic traces for stacking at operation 275. In some aspects, a number of seismic traces to select is first determined. For example, the number of seismic traces to stack may be determined based on a maximum eigenvalue of the correlation matrices. The eigenvalues represents a measure of the magnitude or strength of the correlation matrices and the maximum eigenvalue represents the most dominant characteristic or feature in the matrix and provides an indication of how much signal coherence exists in the dataset. In some aspects, the eigenvalues are calculated iteratively using a Jacobi method. In some aspects, the matrix with the highest eigenvalue suggests the greatest consistency or quality in the data. If the maximum eigenvalue is high, the shots in the correlation matrix are highly consistent with each other and a higher number of seismic traces may be determined for stacking. Conversely, if the maximum eigenvalue is lower, indicating less consistency, fewer seismic traces may be determined for stacking to avoid noise and maintain the quality of the final seismic image.

Figure 6:
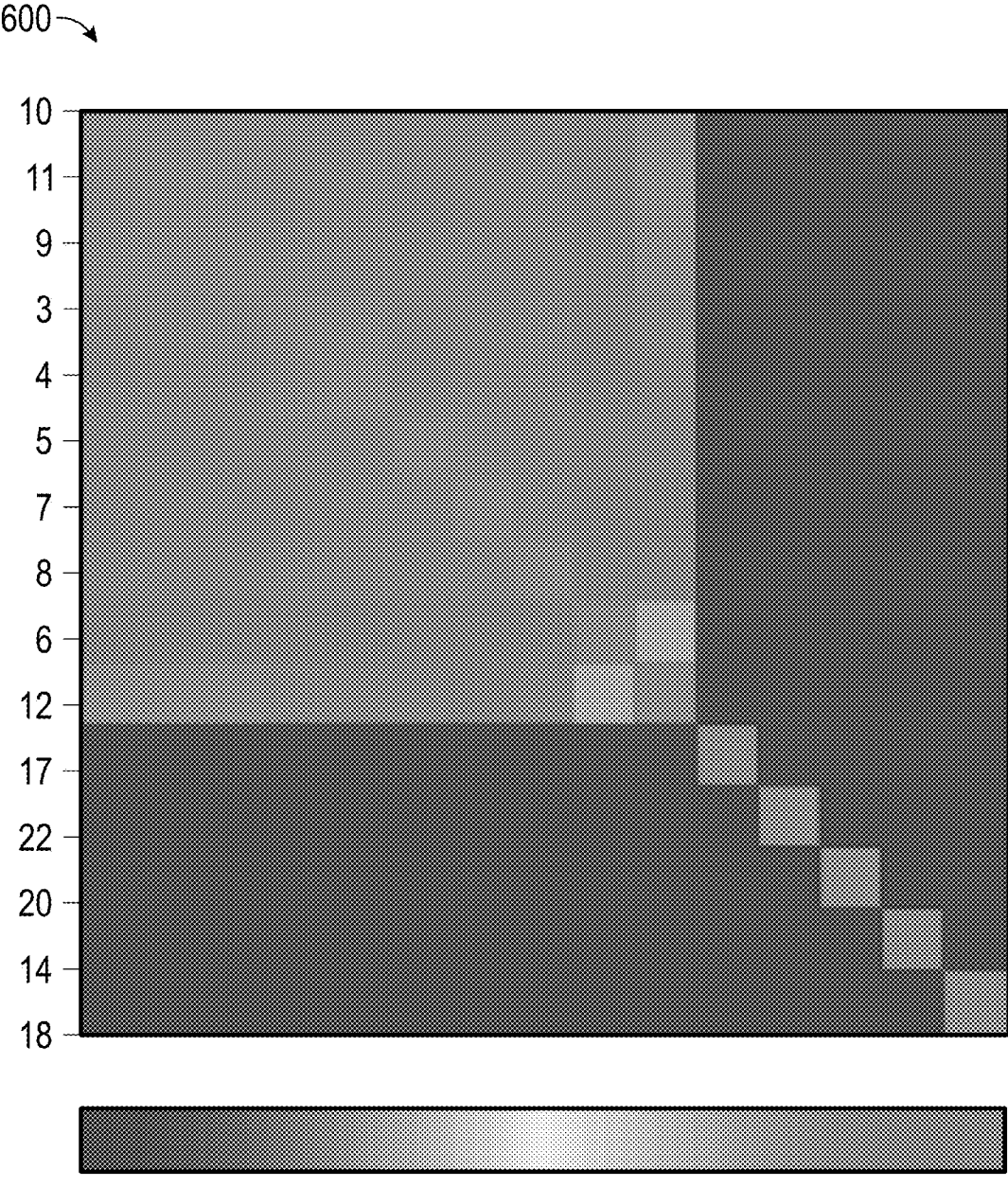
FIG. 6 depicts an example correlation matrix of the example fifteen seismic traces of FIG. 5 according to certain aspects.

FIG. 6 depicts an example correlation matrix 600 for the selected fifteen seismic traces depicted in FIG. 5. The correlation coefficients may be calculated for each combination of the selected seismic waveform signatures of the fifteen selected seismic traces. The correlation coefficient may then be sorted and the correlation coefficient matrix 600 may then be generated from the sorted correlation coefficient values. In the example depicted in FIG. 6, the maximum eigenvalue is 10. Thus, the top ten seismic waveform signatures may be selected in this example.

As shown in FIG. 2B, the process flow 200 further includes, at operation 280, multi-component waveform stacking of the selected number of waveforms.

In some aspects, the multi-component waveform stacking of the selected number of waveforms at operation 280 includes stacking the selected number of waveform signatures at operation 285. In some aspects, the 4C data is stacked. In some aspects, the stacking may be based on a median, a weighted average, or weighted mean. Median or average stacking combines multiple seismic traces, taking a median value or averaging the seismic traces at each time point across all seismic traces is selected. This helps to minimize the impact of outliers or extreme noise. In a weighted mean or average, each trace in the stack is assigned a weight based on some criteria (e.g., signal quality or reliability). The weighted mean takes the strength of each trace into account, allowing for more reliable traces to have a greater influence on the stacked result. The weighted mean may be used when the seismic traces have varying levels of confidence.

In some aspects, the multi-component waveform stacking of the selected number of waveforms at operation 280 includes estimating first arrival time (FAT) at operation 290. The FAT estimates the time at which the first seismic wave (typically a P-wave) from a seismic source arrives at the sensor by calculating the ratio between the short-term average and long-term average of the seismic signal's energy/ Estimating the FAT at operation 290 may include using a short-time average (STA)/long-time average (LTA) algorithm to estimate the FAT. The STA is the average signal energy over a short time window and the LTA is average signal energy over a longer time window. The modified STA/LTA algorithm may involve adjusting the windows or the thresholds to account for noise or specific characteristics of the seismic data. One STA/LTA algorithm is described in Allen, R. V., 1978, "Automatic earthquake recognition and timing from single traces: Bulletin of the Seismological Society of America", 68, 1521-1532, which is incorporated herein by reference.

Figure 7:
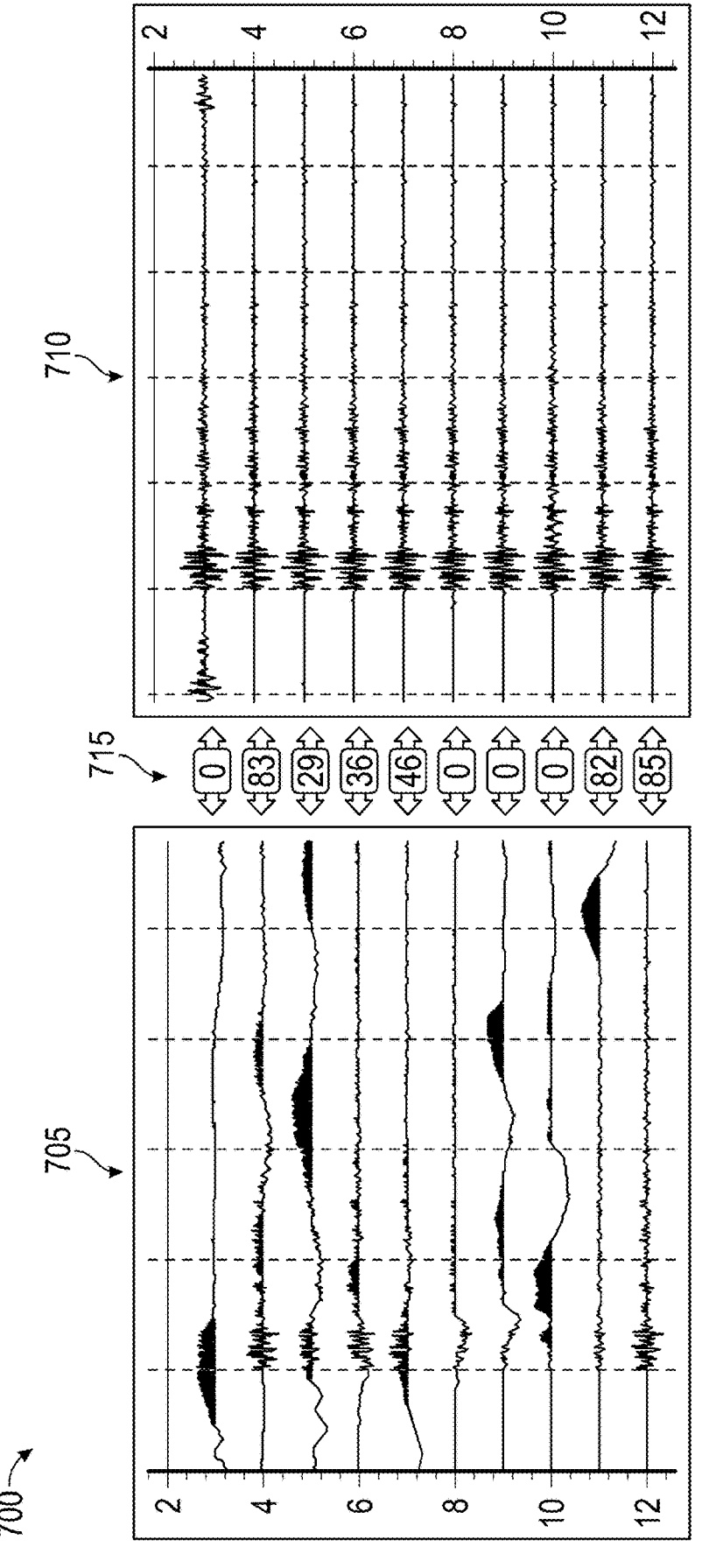
FIG. 7 depicts weights applied to example waveforms.

The modification might involve better handling of noise, filtering, or fine-tuning the time windows to improve the detection of the FAT. FIG. 7 depicts weights applied to example waveforms. As shown, in some aspects, weight factors 715 may be assigned based on a comparison of the raw waveforms 705 to the signature waveforms 710.

Returning to FIG. 2B, the process flow 200 further includes, real-time multi-component data output at operation 295. Outputting the real-time multi-component data at operation 295 may include sending a data window centered on the FAT with a quality indicator at operation 296. In some aspects, the data window corresponds to a specific time segment of the recorded seismic data around an event of interest, such as the FAT in this case. The quality indicator may provide metrics that describe the quality or reliability of the seismic data, such as signal strength, noise levels, SNR, or other factors that assess the accuracy and reliability of the recorded data.

In some aspects, the real-time component data and quality indicator may be sent to the surface via mud-pulse telemetry. Mud-pulse telemetry is a communication technique used in drilling operations to send data from the downhole tools to the surface. Mud-pulse telemetry involves encoding information in pressure pulses transmitted through the drilling mud (the fluid circulating inside the wellbore). These pressure pulses are detected at the surface and decoded into useful data for real-time monitoring and analysis.

In some aspects, the data is compressed before it is sent to the surface. In some aspects, the compression is performed via decimation of the seismic data. Decimation reduces the size of data by systematically eliminating samples or data points. Decimation involves reducing the sampling rate of a signal by keeping every Nth sample and discarding the rest. N is called the decimation factor. For example, if a signal is sampled at 1000 Hz and the decimation factor is 2, the new sampling rate will be 500 Hz. Before downsampling, the signal may be passed through a low-pass filter to prevent aliasing. Aliasing occurs when higher-frequency components of the signal overlap with lower-frequency components, distorting the signal. The low-pass filter may remove frequencies above the Nyquist frequency of the new sampling rate.

In some aspects, the process flow 200 includes displaying the real time multi-component data at operation 297. In some aspects, the real time multi-component data may be displayed on a display at the surface, on a user device, or on a remote display.

In some aspects, the process flow 200 includes controlling the drilling operation based on the real-time multi-component data at operation 298. For example, the real-time multi-component data can be used to make informed decisions about the drilling operation, such as adjusting the target trajectory to avoid hazards, or reach target zones more effectively, ultimately reducing drilling time and costs. In some aspects, the control of the drilling operation based on the real-time multi-component data at operation 298 may be automated and performed autonomously by the system. In some aspects, the control of the drilling operation based on the real-time multi-component data at operation 298 may be based on input from a user.

Note that process flow 200 is just one example of a method, and other methods including fewer, additional, or alternative steps are possible consistent with this disclosure.

By implementing the process flow 200 in real time downhole, the optimal set of seismic waveforms to be windowed, stacked, and sent up hole in real time with relevant QC information may be selected automatically (and autonomously). This, in turn, enables accurate selection of surface to downhole transit times.

Example Method for Stacking for
Multi-Component Seismic While Drilling Seismic
Waveforms FIG. 8 illustrates an example workflow 800 for providing stacked multi-component seismic while drilling (SWD) data. Aspects of the workflow 800 may be performed by a system for multi-component SWD seismic waveform stacking, such as, for example, the system 900 discussed in more detail below with respect to FIG. 9.

As shown, the example workflow 800 may begin, at operation 805, with obtaining, by at least one processor, multi-component SWD seismic waveforms associated with a planned well. In some aspects, the multi-component SWD seismic waveforms include pressure waveform components and shear waveform components.

In some aspects, obtaining the multi-component seismic SWD waveforms at operation 805, includes obtaining the pressure waveforms from one or more hydrophones located downhole in the planned well and obtaining the shear waveforms from one or more geophones located downhole in the planned well.

In some aspects, the multi-component SWD seismic waveforms includes sets of seismic traces. Each seismic trace may be associated with pressure or shear waveforms received at one of the one or more hydrophones or geophones during a time window. Each set of seismic traces may be associated with a shot.

The example workflow 800 may include, at operation 810, pre-processing, at the at least one processor, the multi-component seismic SWD waveforms to generate an ordered subset of filtered SWD seismic waveforms.

In some aspects, pre-processing the multi-component seismic SWD waveforms at operation 810 includes detrending the seismic traces to zero mean; filtering, with a first high pass filter, the seismic traces; determining root mean squares of the seismic traces; normalizing the root mean squares of the seismic traces; filtering, with a second high pass filter, the seismic traces; extracting seismic waveform signatures from the filtered seismic traces; determining signal-to-noise ratios (SNRs) for the filtered seismic traces; ordering the filtered seismic traces in order of the determined SNRs for the filtered seismic traces; and selecting a subset of the filtered seismic traces based on the ordering for the filtered seismic traces. In some aspects, each of the subset of the filtered seismic traces is associated with a different shot.

The example workflow 800 may include, at operation 815, determining, based on a maximum eigenvalue associated a first maximum correlation matrix of the pressure waveform components and a second maximum correlation matrix of the shear waveform components, a number of the subset of filtered SWD seismic waveforms to stack.

In some aspects, determining, based on the maximum eigenvalue associated with the first maximum correlation matrix of the pressure waveform components and the second maximum correlation matrix of the shear waveform components, the number of the subset of filtered SWD seismic waveforms to stack at operation 815 includes correlating each component of the subset of filtered SWD seismic waveforms to determine correlation coefficients; generating correlation coefficient matrices for each component of the subset of filtered SWD seismic waveforms based on the correlation coefficients; sorting the subset of filtered SWD seismic waveforms based on the correlation coefficients; generating, based on the correlation coefficient matrices, the first maximum correlation matrix for the pressure waveform components and the second maximum correlation matrix for the shear waveform components; determining the maximum eigenvalue associated with the first and second maximum correlation matrices; and determining, based on the determined maximum eigenvalue, the number of the subset of filtered SWD seismic waveforms to stack.

In some aspects, sorting the subset of filtered SWD seismic waveforms based on the correlation coefficients includes sorting the subset of filtered SWD seismic waveforms based on a weighted average or a weighted median of summed correlation coefficients.

In some aspects, correlating each component of the subset of filtered SWD seismic waveforms to determine correlation coefficients includes correlating each combination of the components of the subset of filtered SWD seismic waveforms.

The example workflow 800 may include, at operation 820, stacking the number of filtered SWD seismic waveforms. In some aspects, the stacking includes combing of the number of filtered SWD seismic waveforms.

The example workflow 800 may include, at operation 825, estimating a first arrival time (FAT) associated with the multi-component SWD seismic waveforms.

The example workflow 800 may include, at operation 830, sending the stacked number of filtered SWD seismic waveforms to a surface equipment. The stacked number of filtered SWD seismic waveforms are centered around the estimated FAT.

In some aspects, the example workflow 800 includes compressing the stacked number of filtered SWD seismic waveforms. In this case, sending the stacked number of filtered SWD seismic waveforms to the surface equipment at operation 830 includes sending the compressed stacked number of filtered SWD seismic waveforms to a surface equipment via mud pulse telemetry.

In some aspects, the example workflow 800 includes displaying the stacked number of filtered SWD seismic waveforms on a display.

In some aspects, the example workflow 800 includes automatically controlling a drilling operation of the well based on the stacked number of filtered SWD seismic waveforms. In some aspects, automatically controlling the drilling operation of the well based on the stacked number of filtered SWD seismic waveforms includes identifying one or more hazards based on the stacked number of filtered SWD seismic waveforms and adjusting a trajectory of the planned well based on the one or more identified hazards. In some aspects, automatically controlling the drilling operation of the well based on the stacked number of filtered SWD seismic waveforms includes determining an enhanced trajectory to a drilling target based on the stacked number of filtered SWD seismic waveforms and adjusting a trajectory of the planned well based on the enhanced trajectory.

Example System for Stacking for Multi-Component Seismic While Drilling System FIG. 9 depicts an example multi-component SWD seismic waveform stacking system 900.

As shown, the multi-component SWD seismic waveform system 900 may include a user interface 905. In some aspects, the user interface 905 includes a graphical user interface (GUI) that displays to a user and accepts inputs from the user. In some aspects, the user interface 905 includes one or more input/output (IOs) interfaces that allows one or more I/O devices (e.g., keyboards, displays, mouse devices, pen inputs, microphones, etc.) to connect to the quantitative brine analysis system 900. In some aspects, the user interface 905 may allow a user to input information to the multi-component SWD seismic waveform system 900.

As shown, the multi-component SWD seismic waveform system 900 may include a transceiver 910 and a network interface 915. In some aspects, the transceiver 910 and network interface 915 may allow the multi-component SWD seismic waveform system 900 to connect to a network to obtain or output seismic data, control drilling equipment, and/or communicate with other components within or external to the multi-component SWD seismic waveform system 900.

As shown, the multi-component SWD seismic waveform system 900 may include a display 920. The display 920 may be configured to display one or more visualizations of the real-time output stacked multi-component SWD seismic waveform data in accordance with techniques described herein As shown, the multi-component SWD seismic waveform system 900 may include one or more multi-component seismic sensor(s) 925. The multi-component seismic sensor(s) 925 may include sensors configured to obtain of the SWD multi-component seismic waveform data described herein. In some aspects, the multi-component seismic sensor(s) 925 may provide information of the SWS multi-component seismic waveform data to the processor(s) 930 of the multi-component SWD seismic waveform system 900 for use in the stacking.

As shown, the multi-component SWD seismic waveform system 900 may include a processing system including one or more processor(s) 930. The one or more processor(s) 930 may comprise one or more central processing units (CPUs). The processing system may further include memory and/or storage, which may be local to the quantitative brine analysis system 900 or remote (e.g., cloud storage). The CPU may retrieve and execute programming instructions stored in the memory. Similarly, the CPU may retrieve and store application data residing in the memory. The CPU may have multiple processing cores. The memory may represent a random access memory (RAM). The storage may be a disk drive, a combination of fixed or removable storage devices, such as fixed disc drives, removable memory cards or optical storage, network attached storage (NAS), or a storage area-network (SAN).

As shown, the one or more processor(s) 930 may include detrending circuitry 932, first low cut filtering circuitry 934, RMS circuitry 936, normalizing circuitry 938, second low cut filtering circuitry 940, signature extraction circuitry 942, SNR circuitry 944, shot selection circuitry 946, correlation circuitry 948, stacking waveform circuitry 950, FAT estimation circuitry 952, and drilling control circuitry 954.

The detrending circuitry 932 may be configured to detrend seismic traces in accordance with techniques described herein. The first low cut filtering circuitry 934 may be configured to filter low frequencies in seismic waveforms in accordance with techniques described herein. The RMS circuitry 936 may be configured to calculate RMS of waveforms in accordance with techniques described herein. The normalizing circuitry 938 may be configured to normalize the RMSs in accordance with techniques described herein. The second low cut filtering circuitry 940 may be configured to filter second low frequencies from seismic waveforms in accordance with techniques described herein. The signature extraction circuitry 942 may be configured to extract waveform signatures from the seismic waveforms in accordance with techniques described herein. The SNR circuitry 944 may be configured to calculate SNRs for the seismic waveforms and to sort the seismic waveforms based on the respective SNRs in accordance with techniques described herein. The shot selection circuitry 946 may be configured to select seismic waveforms in accordance with techniques described herein. The correlation circuitry 948 may be configured to correlate seismic waveforms across components, traces, and shots, determine correlation coefficients, generate correlation coefficient matrices, identify maximum correlation matrices, sum correlation values, and sort shots in order of summed correlation values in accordance with techniques described herein. The stacking waveform circuitry 950 may be configured to determine an eigenvalue associated with maximum correlation matrices, determine a number of seismic waveforms to stack based on a maximum eigenvalue, and stack seismic waveforms in accordance with techniques described herein. The FAT estimation circuitry 952 may be configured to estimate FAT in accordance with techniques described herein. The drilling control circuitry 954 may be configured to control drilling equipment 970 based on the stacked multi-component SWD seismic waveform data in accordance with techniques described herein.

The one or more processor(s) 930 may further include compression circuitry (not shown) configured to compress the stacked multi-component SWD seismic waveform data before storing or transmitting the data.

The one or more processor(s) 930 may further include mud pulse circuitry (not shown) configured to encode the stacked multi-component SWD seismic waveform data in mud pulses sent to the surface.

As shown the multi-component SWD seismic waveform system 900 may include a memory(ies) 960. In some aspects, the memory(ies) 960 may store the multi-component SWD seismic waveform data.

Example Clauses

Implementation examples are described in the following numbered clauses:

Clause 1: A method for providing stacked multi-component seismic while drilling (SWD) seismic waveforms, the method comprising: obtaining, by at least one processor, multi-component SWD seismic waveforms associated with a planned well, wherein the multi-component SWD seismic waveforms include pressure waveform components and shear waveform components; pre-processing, at the at least one processor, the multi-component seismic SWD waveforms to generate an ordered subset of filtered SWD seismic waveforms; determining, based on a maximum eigenvalue associated a first maximum correlation matrix of the pressure waveform components and a second maximum correlation matrix of the shear waveform components, a number of the subset of filtered SWD seismic waveforms to stack; stacking the number of filtered SWD seismic waveforms, wherein the stacking includes combing of the number of filtered SWD seismic waveforms; estimating a first arrival time (FAT) associated with the multi-component SWD seismic waveforms; and sending the stacked number of filtered SWD seismic waveforms to a surface equipment, wherein the stacked number of filtered SWD seismic waveforms are centered around the estimated FAT.

Clause 2: The method of Clause 1, wherein obtaining multi-component seismic SWD waveforms comprises: obtaining the pressure waveforms from one or more hydrophones located downhole in the planned well; and obtaining the shear waveforms from one or more geophones located downhole in the planned well.

Clause 3: The method of Clause 2, the multi-component SWD seismic waveforms comprise sets of seismic traces, each seismic trace associated with pressure or shear waveforms received at one of the one or more hydrophones or geophones during a time window, and each set of seismic traces associated with a shot.

Clause 4: The method of Clause 3, wherein pre-processing the multi-component seismic SWD waveforms comprises: detrending the seismic traces to zero mean; filtering, with a first high pass filter, the seismic traces; determining root mean squares of the seismic traces; normalizing the root mean squares of the seismic traces; filtering, with a second high pass filter, the seismic traces; extracting seismic waveform signatures from the filtered seismic traces; determining signal-to-noise ratios (SNRs) for the filtered seismic traces; ordering the filtered seismic traces in order of the determined SNRs for the filtered seismic traces; and selecting a subset of the filtered seismic traces based on the determined SNRs for the filtered seismic traces.

Clause 5: The method of Clause 4, wherein each of the subset of the filtered seismic traces is associated with a different shot.

Clause 6: The method of any combination of Clauses 1-5, wherein determining, based on the maximum eigenvalue associated with the first maximum correlation matrix of the pressure waveform components and the second maximum correlation matrix of the shear waveform components, the number of the subset of filtered SWD seismic waveforms to stack comprises: correlating each component of the subset of filtered SWD seismic waveforms to determine correlation coefficients; generating correlation coefficient matrices for each component of the subset of filtered SWD seismic waveforms based on the correlation coefficients; sorting the subset of filtered SWD seismic waveforms based on the correlation coefficients; generating, based on the correlation coefficient matrices, the first maximum correlation matrix for the pressure waveform components and the second maximum correlation matrix for the shear waveform components; determining the maximum eigenvalue associated with the first and second maximum correlation matrices; and determining, based on the determined maximum eigenvalue, the number of the subset of filtered SWD seismic waveforms to stack.

Clause 7: The method of Clause 6, wherein sorting the subset of filtered SWD seismic waveforms based on the correlation coefficients comprises sorting the subset of filtered SWD seismic waveforms based on a weighted average or a weighted median of summed correlation coefficients.

Clause 8: The method of any combination of Clauses 6-7, wherein correlating each component of the subset of filtered SWD seismic waveforms to determine correlation coefficients comprises correlating each combination of the components of the subset of filtered SWD seismic waveforms.

Clause 9: The method of any combination of Clauses 1-8, further comprising compressing the stacked number of filtered SWD seismic waveforms, wherein sending the stacked number of filtered SWD seismic waveforms to a surface equipment comprises sending the compressed stacked number of filtered SWD seismic waveforms to a surface equipment via mud pulse telemetry.

Clause 10: The method of any combination of Clauses 1-9, further comprising displaying the stacked number of filtered SWD seismic waveforms on a display.

Clause 11: The method of any combination of Clauses 1-10, further comprising automatically controlling a drilling operation of the well based on the stacked number of filtered SWD seismic waveforms.

Clause 12: The method of Clause 11, wherein automatically controlling the drilling operation of the well based on the stacked number of filtered SWD seismic waveforms comprises at least one of: (i) identifying one or more hazards based on the stacked number of filtered SWD seismic waveforms; and adjusting a trajectory of the planned well based on the one or more identified hazards; or (ii) determining an enhanced trajectory to a drilling target based on the stacked number of filtered SWD seismic waveforms; and adjusting the trajectory of the planned well based on the enhanced trajectory.

Clause 13: An apparatus comprising means for performing a method in accordance with any of Clauses 1-12.

Clause 14: A computer-readable medium comprising executable instructions that, when executed by one or more processors of an apparatus, cause the apparatus to perform a method in accordance with any of Clauses 1-12.

Clause 15: A computer program product embodied on a computer-readable storage medium comprising code for performing a method in accordance with any of Clauses 1-12.

Clause 16: An apparatus comprising: a memory comprising executable instructions and one or more processors configured to execute the executable instructions and cause the apparatus to perform a method in accordance with any of Clauses 1-12.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of aspects discussed without departing from the scope of the disclosure. Various examples may omit, substitute, or add various procedures or aspects as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing stacked multi-component seismic while drilling (SWD) seismic waveforms, the method comprising:

obtaining, by at least one processor, multi-component SWD seismic waveforms associated with a planned well, wherein:

the multi-component SWD seismic waveforms include pressure waveform components and shear waveform components;

obtaining multi-component seismic SWD waveforms comprises:

obtaining the pressure waveform components from one or more hydrophones located downhole in the planned well; and obtaining the shear waveform components from one or more geophones located downhole in the planned well;

the multi-component SWD seismic waveforms include sets of seismic traces;

each seismic trace is associated with the pressure waveform components received at one of the one or more hydrophones or the shear waveform components received at one of the one or more geophones during a time window; and each set of seismic traces is associated with a shot;

pre-processing, at the at least one processor, the multi-component seismic SWD waveforms to generate an ordered subset of filtered SWD seismic waveforms, wherein pre-processing the multi-component seismic SWD waveforms comprises:

detrending the seismic traces to zero mean;

filtering, with a first high pass filter, the seismic traces;

determining root mean squares of the seismic traces;

normalizing the root mean squares of the seismic traces;

filtering, with a second high pass filter, the seismic traces;

extracting seismic waveform signatures from the filtered seismic traces;

determining signal-to-noise ratios (SNRs) for the filtered seismic traces;

ordering the filtered seismic traces in order of the determined SNRs for the filtered seismic traces; and selecting a subset of the filtered seismic traces based on the ordering of the filtered seismic traces;

determining, based on a maximum eigenvalue associated with a first maximum correlation matrix of the pressure waveform components and a second maximum correlation matrix of the shear waveform components, a number of the subset of filtered SWD seismic waveforms to stack;

stacking the number of filtered SWD seismic waveforms, wherein the stacking includes combing of the number of filtered SWD seismic waveforms;

estimating a first arrival time (FAT) associated with the multi-component SWD seismic waveforms; and sending the stacked number of filtered SWD seismic waveforms to a surface equipment, wherein the stacked number of filtered SWD seismic waveforms are centered around the estimated FAT; and automatically controlling a drilling operation of the planned well based on the stacked number of filtered SWD seismic waveforms.

2. The method of claim 1, wherein each of the subset of the filtered seismic traces is associated with a different shot.

3. The method of claim 1, wherein determining, based on the maximum eigenvalue associated with the first maximum correlation matrix of the pressure waveform components and the second maximum correlation matrix of the shear waveform components, the number of the subset of filtered SWD seismic waveforms to stack comprises:

correlating each component of the subset of filtered SWD seismic waveforms to determine correlation coefficients;

generating correlation coefficient matrices for each component of the subset of filtered SWD seismic waveforms based on the correlation coefficients;

sorting the subset of filtered SWD seismic waveforms based on the correlation coefficients;

generating, based on the correlation coefficient matrices, the first maximum correlation matrix for the pressure waveform components and the second maximum correlation matrix for the shear waveform components;

determining the maximum eigenvalue associated with the first and second maximum correlation matrices; and determining, based on the determined maximum eigenvalue, the number of the subset of filtered SWD seismic waveforms to stack.

4. The method of claim 3, wherein sorting the subset of filtered SWD seismic waveforms based on the correlation coefficients comprises sorting the subset of filtered SWD seismic waveforms based on a weighted average or a weighted median of summed correlation coefficients.

5. The method of claim 3, wherein correlating each component of the subset of filtered SWD seismic waveforms to determine correlation coefficients comprises correlating each combination of the components of the subset of filtered SWD seismic waveforms.

6. The method of claim 1, further comprising compressing the stacked number of filtered SWD seismic waveforms, wherein sending the stacked number of filtered SWD seismic waveforms to the surface equipment comprises sending the compressed stacked number of filtered SWD seismic waveforms to the surface equipment via mud pulse telemetry.

7. The method of claim 1, further comprising displaying the stacked number of filtered SWD seismic waveforms on a display.

8. The method of claim 1, wherein automatically controlling the drilling operation of the planned well based on the stacked number of filtered SWD seismic waveforms comprises at least one of:

(i) identifying one or more hazards based on the stacked number of filtered SWD seismic waveforms; and adjusting a trajectory of the planned well based on the one or more identified hazards; or (ii) determining an enhanced trajectory to a drilling target based on the stacked number of filtered SWD seismic waveforms; and adjusting the trajectory of the planned well based on the enhanced trajectory.

9. A non-transitory computer readable medium storing computer executable code for providing stacked multi-component seismic while drilling (SWD) seismic waveforms, the computer executable code comprising:

code for obtaining, by at least one processor, multi-component SWD seismic waveforms associated with a planned well, wherein:

the multi-component SWD seismic waveforms include pressure waveform components and shear waveform components;

the code for obtaining multi-component seismic SWD waveforms comprises:

code for obtaining the pressure waveform components from one or more hydrophones located downhole in the planned well; and code obtaining the shear waveform components from one or more geophones located downhole in the planned well;

the multi-component SWD seismic waveforms include sets of seismic traces;

each seismic trace is associated with the pressure waveform components received at one of the one or more hydrophones or the shear waveform components received at one of the one or more geophones during a time window; and each set of seismic traces is associated with a shot;

code for pre-processing, at the at least one processor, the multi-component seismic SWD waveforms to generate an ordered subset of filtered SWD seismic waveforms, wherein the code for pre-processing the multi-component seismic SWD waveforms comprises:

code for detrending the seismic traces to zero mean;

code for filtering, with a first high pass filter, the seismic traces;

code for determining root mean squares of the seismic traces;

code for normalizing the root mean squares of the seismic traces;

code for filtering, with a second high pass filter, the seismic traces;

code for extracting seismic waveform signatures from the filtered seismic traces;

code for determining signal-to-noise ratios (SNRs) for the filtered seismic traces;

code for ordering the filtered seismic traces in order of the determined SNRs for the filtered seismic traces; and code for selecting a subset of the filtered seismic traces based on the ordering of the filtered seismic traces;

code for determining, based on a maximum eigenvalue associated with a first maximum correlation matrix of the pressure waveform components and a second maximum correlation matrix of the shear waveform components, a number of the subset of filtered SWD seismic waveforms to stack;

code for stacking the number of filtered SWD seismic waveforms, wherein the stacking includes combing of the number of filtered SWD seismic waveforms;

code for estimating a first arrival time (FAT) associated with the multi-component SWD seismic waveforms;

code for sending the stacked number of filtered SWD seismic waveforms to a surface equipment, wherein the stacked number of filtered SWD seismic waveforms are centered around the estimated FAT; and code for automatically controlling a drilling operation of the planned well based on the stacked number of filtered SWD seismic waveforms.

10. The non-transitory computer readable medium of claim 9, wherein each of the subset of the filtered seismic traces is associated with a different shot.

11. The non-transitory computer readable medium of claim 9, wherein the code for determining, based on the maximum eigenvalue associated with the first maximum correlation matrix of the pressure waveform components and the second maximum correlation matrix of the shear waveform components, the number of the subset of filtered SWD seismic waveforms to stack comprises:

code for correlating each component of the subset of filtered SWD seismic waveforms to determine correlation coefficients;

code for generating correlation coefficient matrices for each component of the subset of filtered SWD seismic waveforms based on the correlation coefficients;

code for sorting the subset of filtered SWD seismic waveforms based on the correlation coefficients;

code for generating, based on the correlation coefficient matrices, the first maximum correlation matrix for the pressure waveform components and the second maximum correlation matrix for the shear waveform components;

code for determining the maximum eigenvalue associated with the first and second maximum correlation matrices; and code for determining, based on the determined maximum eigenvalue, the number of the subset of filtered SWD seismic waveforms to stack.

12. The non-transitory computer readable medium of claim 11, wherein the code for sorting the subset of filtered SWD seismic waveforms based on the correlation coefficients comprises code for sorting the subset of filtered SWD seismic waveforms based on a weighted average or a weighted median of summed correlation coefficients.

13. A drilling system comprising:

drilling equipment for drilling a planned well;

a seismic while drilling (SWD) system comprising:

one or more processors at a surface of the planned well;

one or more processors located downhole in the planned well;

a seismic tool configured to generate a plurality of seismic shots at different times;

a plurality of seismic sensors in the planned well, the plurality of seismic sensors configured to obtain multi-component seismic SWD waveforms, wherein:

the plurality of seismic sensors comprises one or more hydrophones configured to detect pressure waveform components generated by the plurality of seismic shots over a time window and one or more geophones configured to detect shear waveform components generated by the plurality of seismic shots over the time window;

the multi-component SWD seismic waveforms include sets of seismic traces;

each seismic trace is associated with the pressure waveform components received at one of the one or more hydrophones or the shear waveform components received at one of the one or more geophones during a time window; and each set of seismic traces is associated with a shot;

wherein the SWD system is configured to:

pre-process the pressure waveform components and the shear waveform components to generate an ordered subset of filtered SWD seismic waveforms, wherein to pre-process the multi-component seismic SWD waveforms the SWD system is configured to:

detrend the seismic traces to zero mean;

filter, with a first high pass filter, the seismic traces;

determine root mean squares of the seismic traces;

normalize the root mean squares of the seismic traces;

filter, with a second high pass filter, the seismic traces;

extract seismic waveform signatures from the filtered seismic traces;

determine signal-to-noise ratios (SNRs) for the filtered seismic traces;

order the filtered seismic traces in order of the determined SNRs for the filtered seismic traces; and select a subset of the filtered seismic traces based on the ordering of the filtered seismic traces;

determine, based on a maximum eigenvalue associated with a first maximum correlation matrix of the pressure waveform components and a second maximum correlation matrix of the shear waveform components, a number of the subset of filtered SWD seismic waveforms to stack;

stack the number of filtered SWD seismic waveforms, wherein the stacking includes combing of the number of filtered SWD seismic waveforms;

estimate a first arrival time (FAT) associated with the multi-component SWD seismic waveforms; and send the stacked number of filtered SWD seismic waveforms to the one or more surface processors, wherein the stacked number of filtered SWD seismic waveforms are centered around the estimated FAT; and a controller configured automatically control the drilling equipment for drilling the planned well based on the stacked number of filtered SWD seismic waveforms.

\* \* \* \* \*